United States Patent
Okazoe et al.

[11] Patent Number: 5,958,335
[45] Date of Patent: Sep. 28, 1999

[54] METHOD AND APPARATUS FOR PREVENTING CORROSION OF EXHAUST GAS TREATMENT SYSTEMS

[75] Inventors: Kiyoshi Okazoe; Yoshio Nakayama; Koichiro Iwashita; Atsushi Tatani, all of Tokyo; Shigeo Hasegawa, Hiroshima, all of Japan

[73] Assignee: Mitsubishi Jukogyo Kabushiki Kaisha, Tokyo, Japan

[21] Appl. No.: 08/838,417

[22] Filed: Apr. 7, 1997

[30] Foreign Application Priority Data

Apr. 30, 1996 [JP] Japan ................................. 8-109300

[51] Int. Cl.⁶ ......................................... C23F 11/06
[52] U.S. Cl. ........................ 422/13; 422/7; 423/243.02; 423/243.06; 423/243.12; 423/DIG. 8
[58] Field of Search ................. 422/7, 168, 172, 422/13; 423/243.01, 243.02, 243.06, 243.12, DIG. 8

[56] References Cited

U.S. PATENT DOCUMENTS 4,990,319  2/1991  Takenouchi et al. .................. 423/352
5,525,317  6/1996  Bhat et al. .......................... 422/177 X

FOREIGN PATENT DOCUMENTS 0 066 707   12/1982   European Pat. Off. .
63-223188   6/1988    Japan .
2146261     4/1985    United Kingdom .

*Primary Examiner*—Elizabeth McKane
*Attorney, Agent, or Firm*—Michael N. Meller

[57] ABSTRACT

A corrosion preventive method and an apparatus for preventing corrosion of stainless steel components in an exhaust gas desulfurizing apparatus of an exhaust gas treatment system comprising the exhaust gas desulfurizing apparatus for removing at least sulfur dioxide by bringing exhaust gas into contact with absorbing solution, wherein specific means is employed to maintain the $Cl^-$ concentration and $SO_4^{2-}$ concentration at a corrosion preventive side of the corrosion resisting limit of stainless steel.

6 Claims, 3 Drawing Sheets

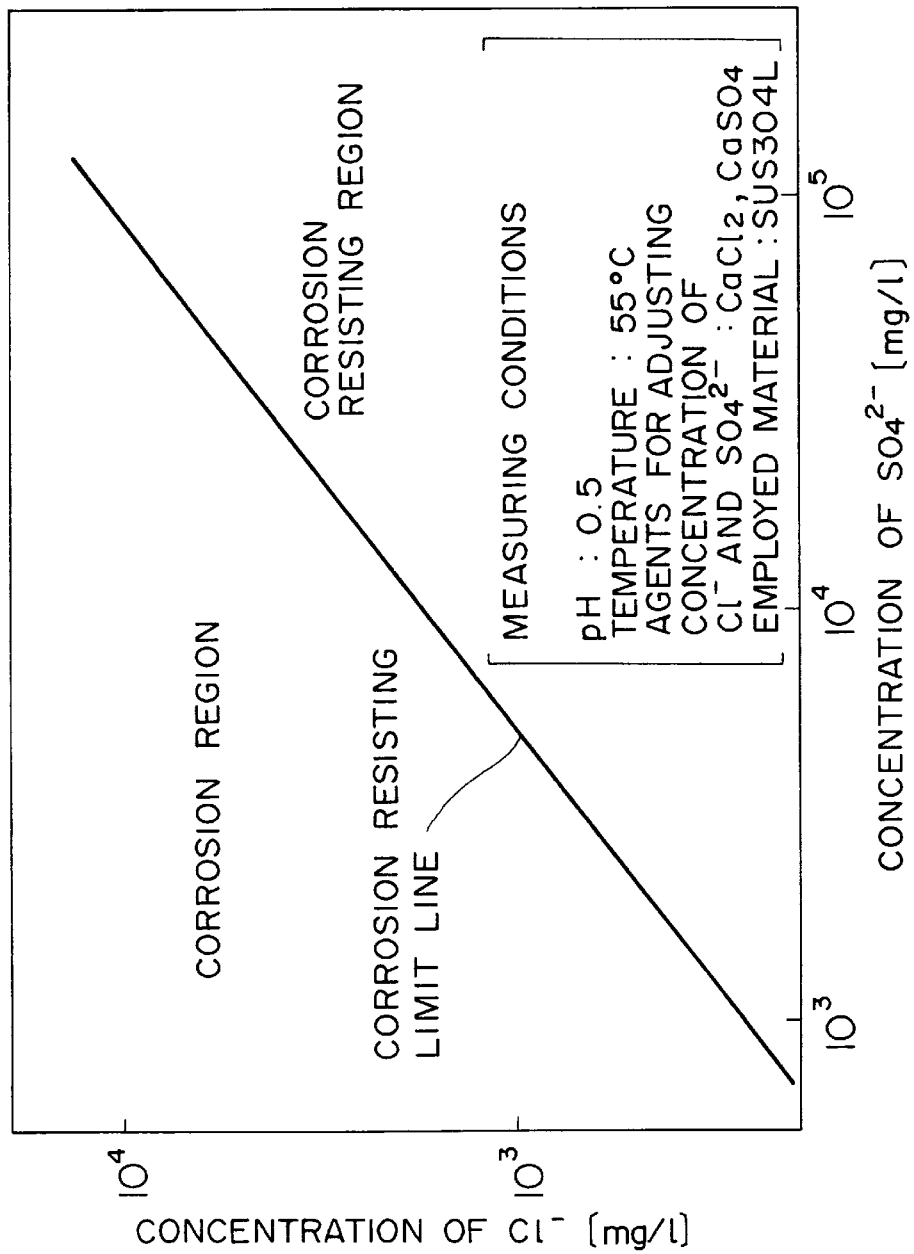

5,958,335

METHOD AND APPARATUS FOR PREVENTING CORROSION OF EXHAUST GAS TREATMENT SYSTEMS

BACKGROUND OF THE INVENTION

1. Field of the Invention

The present invention relates to a method and an apparatus for protecting, from corrosion, stainless steel components of an exhaust gas desulfurization apparatus in an exhaust gas treatment system having the exhaust gas desulfurizing apparatus for remove at least sulfur dioxide gas for exhaust gas generated when fossil fuel is burnt by bringing the exhaust gas into contact with an absorbing solution.

2. Description of the Related Art

In general, an exhaust gas desulfurization apparatus operates in an extremely severe corrosive environment. Since exhaust gas from a boiler or the like, to which the exhaust gas desulfurization apparatus is applied, and industrial water used for the absorbing solution in the exhaust gas desulfurization apparatus generally contain chlorine ions ($Cl^-$), normal stainless steel (for example, SUS304) suffers from pitting corrosion and crevice corrosion if it is simply employed in components of the apparatus which comes to contact with the exhaust gas and the like. Accordingly, carbon steel having a rubber lining or costly and high quality material, such as hastelloy-C, has been employed for the components of the exhaust gas desulfurization apparatus. For cost reduction and ease of maintenance and manufacture, however, a technique which uses the normal is at the same time stainless steel and capable of preventing corrosion has been required in order to reduce cost, easily manufacture the apparatus and easily perform a maintenance operation.

Accordingly, the applicant of the present invention has suggested, in Japanese Patent Provisional Publication No. 223188/1988 (63-223188), a corrosion preventive method accomplished on the basis of a knowledge that sulfate ions ($SO_4^{2-}$) are capable of preventing corrosion caused by chlorine ions ($Cl^-$) by adjusting the ion balance of these ions with addition of sulfate ions.

However, in the corrosion preventive method disclosed in the above publication, a sulfate ion source such as sodium sulfate ($Na_2SO_4$) or ammonium sulfate (($NH_4)_2SO_4$) is supplied to the line of the exhaust gas desulfurization apparatus and thereby sulfate ions are added, but there is no contrivance about the origin of the sulfate ion source. Therefore, it is required to purchase ammonium sulfate or the like, and a system such as a silo for storing ammonium sulfate or the like is required. Thus, there arises a problem in that costs of building the system and costs for the operation increase.

SUMMARY OF THE INVENTION

An object of the present invention is to provide a method and an apparatus for preventing corrosion of an exhaust gas desulfurizing apparatus made of normal stainless steel for an exhaust gas treatment system with low equipment or low operational costs.

According to a first aspect of the present invention, there is provided a corrosion preventive method for preventing corrosion of stainless steel components in an exhaust gas desulfurizing apparatus of an exhaust gas treatment system comprising a dry-type dust collecting apparatus for recovering dust from SOx-containing exhaust gas from a combustion exhaust gas source and an exhaust gas desulfurizing apparatus for bringing exhaust gas into contact with absorbing solution so as to remove at least sulfur dioxide present in the exhaust gas, and said system being arranged such that $NH_3$ is supplied to a line connecting the combustion exhaust gas source with the dry-type dust collecting apparatus so as to solidify $SO_3$ gas present in the exhaust gas as $(NH_4)_2SO_4$ for removing $(NH_4)_2SO_4$ as a dust, said method comprising the steps of: measuring the pH, $Cl^-$ concentration, $SO_4^{2-}$ concentration, and temperature of the absorbing solution; and supplying the dust removed by the dry-type dust collecting apparatus into the absorbing solution to raise the concentration of $SO_4^{2-}$ in the absorbing solution when the state of the absorbing solution determined in accordance with the measured values comes close to a corrosion resisting limit of stainless steel, so that the state of the absorbing solution is maintained on a corrosion preventive side of a corrosion resisting limit of the stainless steel.

Also, the first aspect of the present invention provides an exhaust gas treatment system comprising: a combustion exhaust gas source; a dry-type dust collecting apparatus for recovering dust from exhaust gas; an ammonia supply line for supplying ammonia to a line connecting the combustion exhaust gas source with the dry-type dust collecting apparatus; exhaust gas desulfurizing apparatus for removing at least sulfur dioxide present in the exhaust gas by bringing the exhaust gas allowed to pass through the dry-type dust collecting apparatus into contact with absorbing solution; and a dust supply line extending from the dry-type dust collecting apparatus to the exhaust gas desulfurizing apparatus so as to supply the dust recovered by the dry-type dust collecting apparatus.

According to a second aspect of the present invention, there is provided a corrosion preventive method for preventing corrosion of stainless steel components in an exhaust gas desulfurizing apparatus of an exhaust gas treatment system comprising an exhaust gas desulfurizing apparatus for bringing SOx-containing exhaust gas from a combustion exhaust gas source into contact with absorbing solution so as to remove at least sulfur dioxide present in the exhaust gas and a wet-type dust collecting apparatus, and said system being arranged such dust collecting solution which has absorbed dust in the wet-type dust collecting apparatus is supplied to an absorbing solution of the exhaust gas desulfurizing apparatus and alkali agent for preventing corrosion is supplied to the dust collecting solution, said method comprising the steps of: measuring the pH, $Cl^-$ concentration, $SO_4^{2-}$ concentration, and temperature of the absorbing solution; and adjusting the quantity of the alkali agent to be supplied to the dust collecting solution to raise the $SO_4^{2-}$ concentration in the absorbing solution when the state of the absorbing solution determined in accordance with the measured values comes close to a corrosion resisting limit of stainless steel so that the state of the absorbing solution is maintained on a corrosion preventive side of the corrosion resisting limit of the stainless steel.

In addition, the second aspect of present invention provides an exhaust gas treatment system comprising a combustion exhaust gas source; an exhaust gas desulfurizing apparatus for removing at least sulfur dioxide present in exhaust gas by bringing the exhaust gas into contact with the absorbing solution; sensors for measuring the pH, $Cl^-$ concentration, $SO_4^{2-}$ concentration, and temperature of the absorbing solution in the exhaust gas desulfurizing apparatus; a wet-type dust collecting apparatus for removing dust in exhaust gas by bringing the exhaust gas from the exhaust gas desulfurizing apparatus into contact with the dust collecting solution; a dust collecting solution line for supplying, to the exhaust gas desulfurizing apparatus, the dust collecting solution which has the absorbed dust in the wet-type dust collecting apparatus; an alkali agent supply line for supplying alkali agent to the wet-type dust collecting apparatus; and a controller for adjusting the quantity of the alkali agent to be supplied in response to signals supplied from the sensors.

According to a third aspect of the present invention, there is provided a corrosion preventive method for preventing corrosion of stainless steel components in an exhaust gas desulfurizing apparatus in an exhaust gas treatment system comprising the exhaust gas desulfurizing apparatus for bringing exhaust gas from a combustion exhaust gas source into contact with absorbing solution in which limestone containing Mg compounds is suspended so as to remove at least sulfur dioxide present in the exhaust gas, said method comprising the steps of: measuring the pH, $Cl^-$ concentration, $SO_4^{2-}$ concentration, and temperature of the absorbing solution; adjusting the quantity of the limestone supplied to the absorbing solution to raise the concentration of $Mg^{2+}$ in the absorbing solution so as to raise the concentration of $SO_4^{2-}$ in the absorbing solution when the state of the absorbing solution determined in accordance with the measured values comes close to a corrosion resisting limit of stainless steel so that the state of the absorbing solution is maintained on a corrosion preventive side of the corrosion resisting limit of the stainless steel.

Also, the third aspect of the present invention provides an exhaust gas treatment system comprising: a combustion exhaust gas source; an exhaust gas desulfurizing apparatus for removing at least sulfur dioxide present in exhaust gas by bringing the exhaust gas into contact with absorbing solution in which limestone containing Mg compounds is suspended; an absorbing solution adjustment apparatus for adjusting the state of the absorbing solution to be supplied to the exhaust gas desulfurizing apparatus; sensors for measuring the pH, $Cl^-$ concentration, $SO_4^{2-}$ concentration, and temperature of the absorbing solution in the exhaust gas desulfurizing apparatus; and a controller for adjusting the quantity of the limestone supplied in response to signals supplied from the sensors.

According to the fourth aspect of the present invention, there is provided a corrosion preventive method for preventing corrosion of stainless steel components in an exhaust gas desulfurizing apparatus of an exhaust gas treatment system comprising the exhaust gas desulfurizing apparatus for bringing exhaust gas from a combustion exhaust gas source into contact with absorbing solution, the corrosion preventive method comprising the steps of: measuring the pH, $Cl^-$ concentration, $SO_4^{2-}$ concentration and temperature of the absorbing solution; adjusting the quantity of the absorbing solution to lower the concentration of $Cl^-$ in the absorbing solution when the state of the absorbing solution determined in accordance with the measured values comes cross to a corrosion resisting limit of stainless steel so that the state of the absorbing solution is maintained on a corrosion preventive side of the corrosion resisting limit of the stainless steel.

Besides, the fourth aspect of the present invention provides an exhaust gas treatment system comprising: a combustion exhaust gas source; an exhaust gas desulfurizing apparatus for removing at least sulfur dioxide present in exhaust gas by bringing exhaust gas into contact with absorbing solution; a water discharge line for discharging a portion of water which circulates in the exhaust gas desulfurizing apparatus; sensors for measuring the pH, $Cl^-$ concentration, $SO_4^{2-}$ concentration, and temperature of the absorbing solution in the exhaust gas desulfurizing apparatus; and a controller for adjusting the quantity of water to be discharged from the water discharge line in response to signals supplied from the sensors.

According to a fifth aspect of the present invention, there is provided a corrosion preventive method for preventing corrosion of stainless steel components in an exhaust gas desulfurizing apparatus of an exhaust gas treatment system comprising a dry-type dust collecting apparatus for recovering dust from SOx-containing exhaust gas from a combustion exhaust gas source and the exhaust gas desulfurizing apparatus for bringing exhaust gas into contact with absorbing solution so as to remove at least sulfur dioxide present in the exhaust gas and said system being arranged such that $NH_3$ is supplied to a line connecting the combustion exhaust gas source with the dry-type dust collecting apparatus so as to solidify $SO_3$ gas present in the exhaust gas as $(NH_4)_2SO^4$ for removing $(NH_4)_2SO_4$ as a dust, said method comprising the steps of: measuring the pH, $Cl^-$ concentration, $SO_4^{2-}$ concentration, and temperature of the absorbing solution; adjusting the charge of the wet-type dust collecting apparatus to raise the concentration of the dust at an outlet port of the dry-type dust collecting apparatus to increase the quantity of $(NH_4)_2SO_4$ to be introduced into the exhaust gas desulfurizing apparatus so as to raise the concentration of $SO_4^{2-}$ in the absorbing solution when the state of the absorbing solution determined in accordance with the measured values comes close to a corrosion resisting limit of stainless steel so that the state of the absorbing solution is maintained on a corrosion preventive side of the corrosion resisting limit of the stainless steel.

The fifth aspect of the present invention also provides an exhaust gas treatment system comprising: a combustion exhaust gas source; an ammonia supply line for supplying ammonia to a line connecting the combustion exhaust gas source with the dry-type dust collecting apparatus; an exhaust gas desulfurizing apparatus for removing at least sulfur dioxide present in exhaust gas by bringing exhaust gas allowed to pass through the dry-type dust collecting apparatus into contact with absorbing solution; sensors for measuring the pH, $Cl^-$ concentration, $SO_4^{2-}$ concentration, and temperature of the absorbing solution in the exhaust gas desulfurizing apparatus; and a controller for adjusting the charge of the dry-type dust collecting apparatus in response to signals supplied from the sensors.

The method and apparatus for preventing corrosion according to the present invention are generally capable of protecting a desulfurizing apparatus of an exhaust gas treatment system having components made of normal stainless steel from corrosion without a necessity of using an additional agent. Therefore, the following effects can be obtained:

(1) Since the necessity of using components of the desulfurizing apparatus each having a rubber lining or made of a quality material, such as hastelloy-C, can be eliminated, costs of building the exhaust gas treatment system can significantly be reduced and the operation for maintaining the same can easily be performed.

(2) Without supplying an additional agent which has not been used previously, dust obtained by a dry dust collector is used, or the quantity of conventional alkali agent or absorbing agent (limestone) is adjusted, or the quantity of water to be discharged is adjusted, so as to protect the desulfurizing apparatus having components made of stainless steel from corrosion. Therefore, the necessity of obtaining an additional agent and building an additional equipment such as a silo for storing the agent can be eliminated. As a result, further practical cost down can be realized.

Furthermore, as described above with reference to the first and fifth aspects of the invention, the method in which dust in exhaust gas is supplied to the absorbing agent slurry in the desulfurizing apparatus effectively uses dust which has previously been disposed as waste, the consumption of agents and water therefore does not increase. Thus, a significantly low operational cost can be realized. Moreover, since the presence of ammonia ions in the absorbing agent slurry increases, the desulfurizing effect is improved.

BRIEF DESCRIPTION OF THE DRAWINGS

FIG. 3 is a graph showing results of measurement of a corrosion resisting limit of lower stainless steel.

DETAILED DESCRIPTION OF THE PREFERRED EMBODIMENTS

Preferred embodiments of the present invention will now be described with reference to the drawings.

Figure 1:
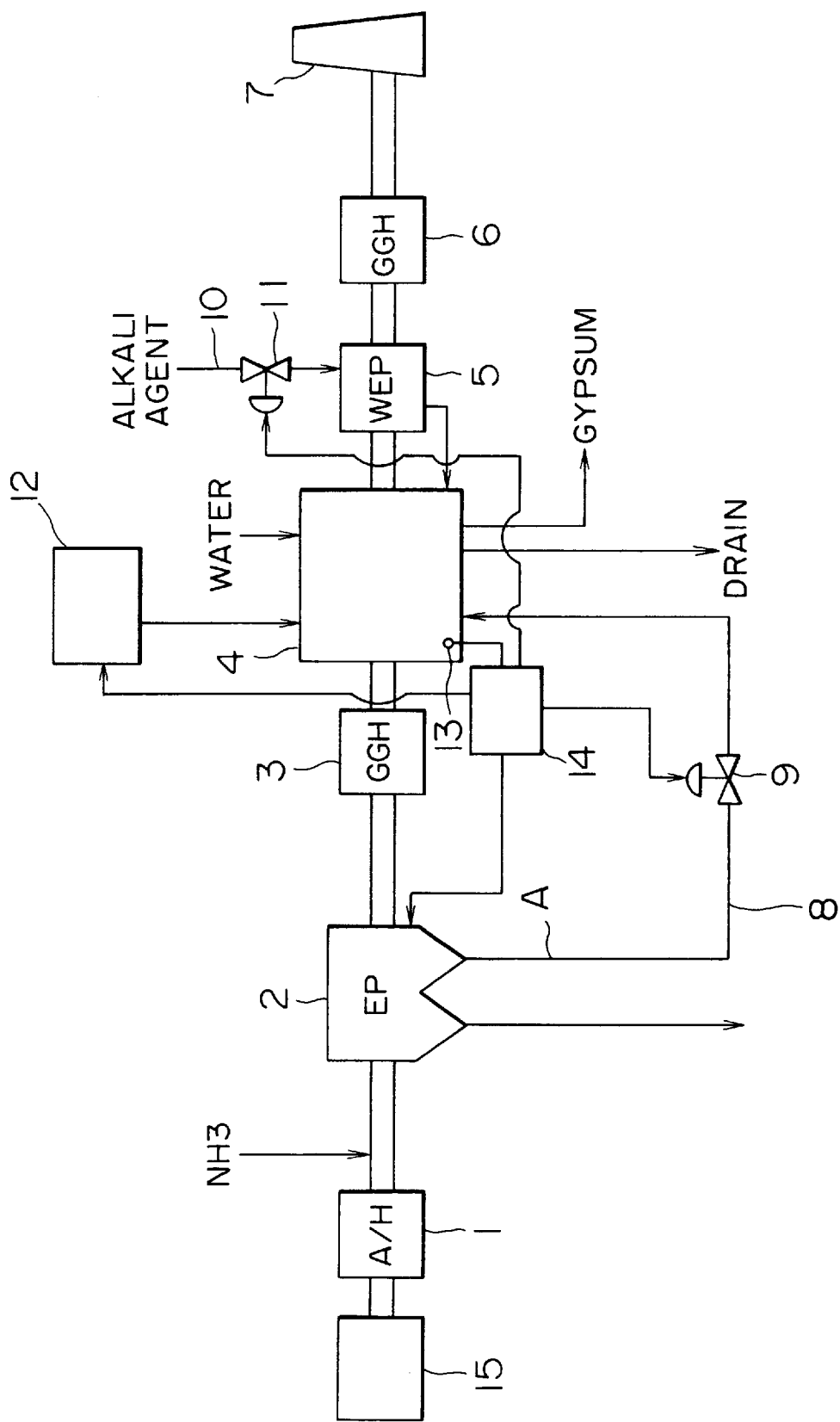
FIG. 1 is a diagram showing an example of an exhaust gas treatment system in which the present invention is embodied.
Figure 2:
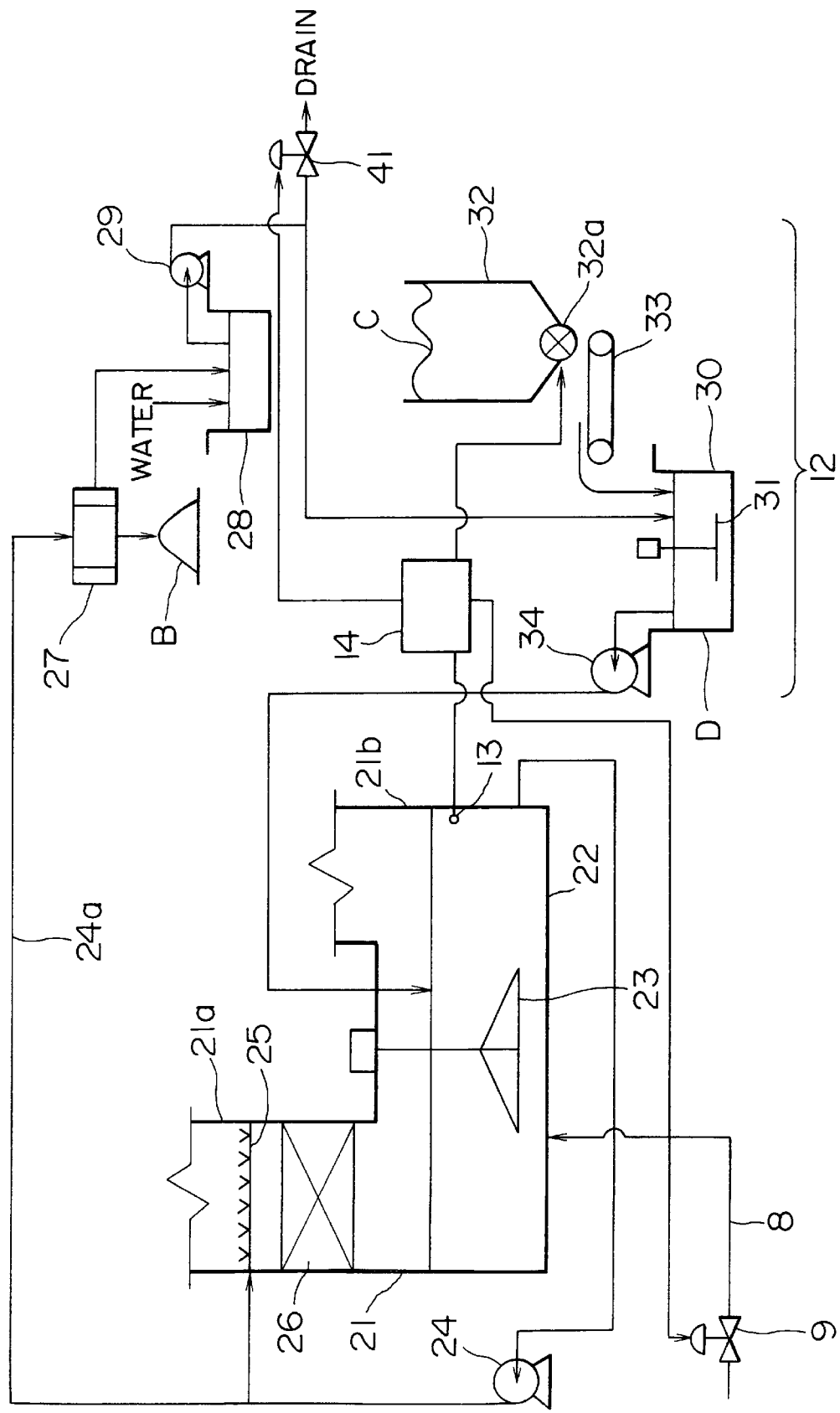
FIG. 2 is a diagram showing an absorbing agent adjusting unit and a controller of a desulfurizing apparatus in the exhaust gas treatment system shown in FIG. 1.

Referring to FIGS. 1 and 2, the structure of an embodiment of an exhaust gas treatment system according to the present invention will now be described. FIG. 1 is a diagram showing the overall structure of the exhaust gas treatment system according to this embodiment, and FIG. 2 is a diagram showing an absorbing agent adjustment unit and a controller of a desulfurizing apparatus in the exhaust gas treatment system according to this embodiment.

The exhaust gas treatment system according to this embodiment is the system for an oil burning boiler using heavy oil, such as residuum, heavy oil or olimulsion. Although construction of such an oil burning boiler as a power generating facility for utility companies has been limited since the oil crisis, it has been widely used by companies other than those specializing in electric power generation in recent years. Although substantially no chlorine is contained in exhaust gas from the oil burning boiler, $SO_3$ gas is present in the exhaust gas in considerably large quantities. In order to remove the $SO_3$ gas, injection of ammonia, as described below, is performed.

As shown in FIG. 1, the exhaust gas treatment system according to this embodiment is structured such that ammonia ($NH_3$) is added to the exhaust gas discharged from a boiler 15 and allowed to pass through an air heater 1; and then dust in the exhaust gas is removed by dry-type electric precipitator (EP) 2. Then, the exhaust gas is allowed to pass through a heat recovery portion 3 of a gas-gas heater (GGH) to recover heat, and then introduced into an exhaust gas desulfurization apparatus 4 so that at least sulfur dioxide gas ($SO_2$) in the exhaust gas is removed. The exhaust gas, from which the sulfur dioxide gas ($SO_2$) has been removed by the exhaust gas desulfurization apparatus 4, is then subjected to a process for removing residual dust by a wet-type dust collector 5. Then, the resulting exhaust gas is heated by a re-heating portion 6 of the gas-gas heater (GGH), and then diffused into the atmosphere from a smokestack 7.

Portion of dust A removed by the electric precipitator 2 is allowed to pass through a dust supply line 8 so as to be injected into absorbing solution in the desulfurization apparatus 4. An injection-quantity adjustment means 9, such as a valve, provided for the dust supply line 8 adjusts the quantity of injection of dust A.

As a practical method for conveying dust A, a structure may be employed in which the dust supply line 8 is composed of pipes into which air is allowed to flow, so as to convey the dust by air pressure, or another structure may be employed in which the dust is formed into slurry so as to be conveyed by a slurry pump under pressure. Alternatively, another structure may be employed in which the dust supply line 8 is composed of a belt conveyor to supply dust to a tank 22 or the like in the desulfurization apparatus 4. When dust A is supplied by the belt conveyor, the quantity of dust A to be dropped from the hopper of the electric precipitator 2 onto the trailing end of the belt conveyor must be adjusted by a measuring separator provided for the hopper.

As described above, exhaust gas discharged from the oil burning boiler which uses residuum or the like as fuel and allowed to pass through the air heater 1 contains sulfate gas ($SO_3$) in a large quantity (for example, about 20 ppm). If $SO_3$ gas is left unattended, corrosion of the units following the electric precipitator 2 comes into question. Therefore, $NH_3$ is added to solidify $SO_3$ gas in the exhaust gas into ammonia sulfate (($NH_4)_2SO_4$), and then removed by the electric precipitator 2 as dust. As a result, dust A removed by the electric precipitator 2 contains ($NH_4)_2SO_4$ in a large quantity in the this case.

The wet-type dust collector 5 removes dust contained in exhaust gas by bringing the exhaust gas into contact with a dust collecting solution. In this case, the dust collecting solution which has absorbed dust is introduced into, for example, absorbing agent slurry in the tank 22 of the exhaust gas desulfurization apparatus as described below so as to be treated. The dust collecting solution in the dust collector 5 is supplied with alkali agent (for example, NaOH) from the line 10 for prevention of corrosion. Although the original purpose of supplying the alkali agent is to prevent corrosion of the dust collector 5 because of any drop in the pH of the dust collecting solution in the dust collector 5, it is, in the present invention, supplied for another purpose of improving the state of the absorbing agent slurry in the exhaust gas desulfurization apparatus toward a corrosion preventive side of a corrosion resisting limit, as described below. In the foregoing case, the line 10 is provided with a flow rate adjustment valve 11 for adjusting the quantity of the alkali agent to be supplied.

The dust collector 5 may be provided only when dust in exhaust gas discharged from the desulfurization apparatus 4 comes into question due to the properties of the exhaust gas. As the dust collecting solution in the dust collector 5, ordinary industrial water may be employed; alternatively, a structure may be employed in which a portion of water in a filtrate tank 28 of the desulfurization apparatus 4 described below is supplied to the dust collector 5 so as to be used as the dust collecting solution.

The desulfurization apparatus 4, as shown in FIG. 2, comprises an absorption tower 21 for bringing exhaust gas into gas-liquid contact with the absorbing solution (hereinafter called "absorbing agent slurry") in which limestone is suspended; a tank 22 which is disposed in the bottom portion of the absorption tower 21 and to which the absorbing agent slurry is supplied; and an arm-rotational air sparger 23 for blowing oxidizing air in the form of small air bubbles while stirring the slurry in the tank 22. Thus, the desulfurization apparatus 4 is able to efficiently bring the absorbing agent slurry which has absorbed the sulfur dioxide gas into contact with air so as to oxidize the overall quantity of the absorbing agent slurry into gypsum.

Sensors 13 for measuring the pH, Cl⁻ concentration, $SO_4^{2-}$ concentration and temperature are optionally provided in the tank 22.

In the desulfurization apparatus 4, untreated exhaust gas is introduced into an exhaust gas introducing portion 21a of the absorption tower 21 so as to be brought into contact with the absorbing agent slurry jetted out from a header pipe 25 by a circulating pump 24, thereby absorbing and removing sulfur dioxide gas in the non-treated exhaust gas; and treated exhaust gas is discharged from an exhaust gas deducing portion 21b. The absorbing agent slurry, which has been jetted out from the header pipe 25 and allowed to pass downwardly through a filler 26 while absorbing sulfur dioxide, is brought into contact with a lot of air bubbles (air) blown from the air sparger 23 while stirred in the tank 22, so that the absorbing agent slurry is oxidized and then formed into gypsum by neutralizing reactions. The main reactions occurred during the foregoing process are represented in the following reaction formulas (1) to (3):
(Exhaust Gas Introducing Portion of Absorption Tower)

$$SO_2 + H_2O \rightarrow H^+ + HSO_3^- \qquad (1)$$

(Tank)

$$H^+ + HSO_3^- + \tfrac{1}{2}O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

Thus, gypsum and small quantities of limestone which is the absorbing agent are suspended in the tank 22, and then supplied through a pipe line 24a branched from a discharge pipe of the circulating pump 24 to a solid-liquid separator 27 and filtered so as to be taken out as gypsum B containing a small quantity of water (usually, content of water is about 10%). On the other hand, the filtrate from the solid-liquid separator 27 is supplied to a filtrate tank 28, stored in the tank 28 temporarily, and then arbitrarily supplied to a slurry adjustment chamber 30 by means of a pump 29 as water for forming the absorbing agent slurry. The filtrate tank 28 is supplemented with water as necessary, as described below.

An absorbing agent adjustment unit 12 comprises a limestone silo 32, a conveyor 33, a slurry adjustment chamber 30, a stirrer 31 and a slurry pump 34.

The slurry adjustment chamber 30 having the stirrer 31 stirs and mixes limestone C (absorbent) supplied from the limestone silo 32 through the conveyor 33 and water supplied from the pump 29 to prepare absorbing agent slurry D. Thus, the absorbing agent slurry D prepared in the slurry adjustment chamber 30 is arbitrarily supplied to the tank 22 of the absorption tower 21 by the slurry pump 34.

A portion of circulating water is discharged to the outside of the system through a flow-rate adjustment valve 41 disposed in the discharge portion of the pump 29 in the case of the structure shown in FIG. 2. If necessary, the water may be discharged in a state which agrees to a discharge water regulation after the pH and COD are adjusted by a discharge water treatment unit (not shown). Alternatively, the water may be returned into the system as a portion of supplementary water after its impurities such as chlorine ions and the like are removed.

FIG. 2 shows the structure arranged such that the dust supply line 8 is connected to the tank 22 of the absorption tower 21 and portion of dust A removed by the electric precipitator 2 is allowed to pass through the dust supply line 8 so as to be supplied to the tank 22, but the position at which dust A is supplied is not limited of this embodiment. For example, dust A may be supplied to the discharge portion of the circulating pump 24 or the pipe line in the suction portion. As an alternative to this, dust A may be supplied to the slurry adjustment chamber 30, or the pipe line in the discharge portion or the suction portion in the slurry pump 34.

The sensor 13 is disposed in the tank 22 or the circulating pump 24 in the discharge portion or the pipe line in the suction portion so as to continuously measure the state of the absorbing agent slurry. The sensor 13 measures the pH, Cl⁻ concentration, $SO_4^{2-}$ concentration and temperature of the absorbing agent slurry and therefore comprises a pH electrode, a thermometer, a Cl⁻ ion electrode, a $SO_4^{2-}$ ion electrode, an ion meter and the like. In order to communicate the state of the absorbing agent slurry to the controller 14, the sensor 13 is connected to the controller 14.

Although the controller 14 is connected to the injection-quantity adjustment means 9, the flow-rate adjustment valve 11, the absorbing agent adjustment unit 12, the flow-rate adjustment valve 41 and the electric precipitator 2 as shown in FIGS. 1 and 2, the connections to all of the foregoing units are not always required. For example, a structure in which the controller is connected to only the injection-quantity adjustment means 9 is included within the scope of the present invention.

The quantity of water to be added to the slurry adjustment chamber 30 is adjusted by the controller 14 and the pump 29 or the flow-rate adjustment valve 41 during operation. Moreover, the operation of the rotary valve 32a of the limestone silo 32 is controlled so that an adequate amount of limestone for the quantity of water to be added is arbitrarily supplied. As a result, a state where the absorbing agent slurry D having a predetermined concentration (for example, about 20 wt %) is always contained in a predetermined range is maintained.

A portion of water equivalent to the gradual reduction due to the discharge from the flow-rate adjustment valve 41, the evaporation in the absorption tower 21 or the like is supplemented by optionally supplying the filtrate tank 28 with supplementary water (industrial water or the like).

In order to maintain the desulfurization ratio and the purity of gypsum at high levels during the operation, the concentration of sulfur dioxide present in the non-treated exhaust gas, the pH in the tank and the concentration of limestone are detected by the sensors 13 and the quantities of limestone and absorbing agent slurry to be added are adjusted by the controller 14.

A method of preventing corrosion employed in the foregoing exhaust gas treatment system having the above-mentioned structure and according to the present invention is described below.

The method of preventing corrosion according to the present invention is structured such that the pH, Cl⁻ concentration and $SO_4^{2-}$ concentration and temperature of the absorbing agent slurry circulating in the absorption tower 21 of the gas desulfurization apparatus 4 are optionally or continuously measured; and when the state of the absorbing agent slurry determined in accordance with the measured values comes close to a corrosion resisting limit of stainless steel, an operation for improving the state of the absorbing agent slurry toward the corrosion resistance region is performed. Thus, the state of the absorbing agent slurry is always maintained in a corrosion preventive side of the corrosion resisting limit of stainless steel.

As a method of measuring the pH, Cl⁻ concentration and $SO_4^{2-}$ concentration and temperature of the absorbing agent slurry, sensors 13 such as a pH electrode, the thermosensor, a Cl⁻ ion electrode, a $SO_4^{2-}$ ion electrode and an ion meter may be disposed in the tank 22, or the pipe line in the suction portion or the discharge portion of the circulating pump 24 to continuously measure the foregoing values. Alternatively, a periodical analysis may be performed manually.

The corrosion resisting limit of normal stainless steel (SUS304, 316, 317 or the like) and Cl⁻ concentration and $SO_4^{2-}$ concentration have relationships as shown in FIG. 3 and represented in the following corrosion resisting limit formula (4):

$$[Cl^-]=a \times \log [SO_4^{2-}]+b \qquad (4)$$

wherein [Cl⁻] and [$SO_4^{2-}$] is the concentration [ppm] of each ions, a: function of the pH and temperature (T° C.) and represented as $a=C_1 \times pH - C_2 \times T + C_3$ ($C_1$, $C_2$ and $C_3$ are constants)

b: constant determined by the material of the apparatus and the surface treatment method.

When the concentration of Cl⁻ is constant, corrosion takes place if the actual $SO_4^{2-}$ concentration is smaller than the limit of $SO_4^{2-}$ concentration calculated using Formula (4). If the foregoing concentration is larger than the limit, corrosion can be prevented. If the pH raises or the temperature falls, the corrosion region widen. As for the material, the corrosion region widen in order of SUS304, 316 and 317. As the surface is smooth, the corrosion region widen.

Therefore, the limit of $SO_4^{2-}$ concentration is obtained from the measured the pH, Cl⁻ concentration and temperature of the absorbing agent slurry on the bases of the foregoing formula (4). The calculated limit of the $SO_4^{2-}$ concentration is compared with the measured $SO_4^{2-}$ concentration of the absorbing agent slurry. If the measured $SO_4^{2-}$ concentration comes close to the calculated limit, it is decided that the state of the absorbing agent comes close to the corrosion resisting limit of the stainless steel.

The phrase "comes close to the limit" and "comes close to the corrosion resisting limit" mean a range (near the corrosion resisting limit) including a margin determined in consideration of measurement errors, and the responsiveness or the controllability, or safety of operations as described below (operations for improving the state of the absorbing agent slurry toward the corrosion preventive region). The foregoing range may arbitrarily be determined in accordance with the characteristics of exhaust gas, the materials of the desulfurizing apparatus, the operational conditions and the degree of load changes.

As an operation for improving the state of the absorbing agent slurry which comes close to the corrosion resisting limit toward the corrosion preventive region or the corrosion preventive side of the limit, the following operations are performed in this embodiment.

In a first operation step, if the state of the absorbing agent slurry comes close to the corrosion resisting limit, dust A removed by the electric precipitator 2 is supplied into the absorbing agent slurry of the gas desulfurization apparatus 4 through the dust supply line 8 and the injection-quantity adjustment means 9, thus increasing $SO_4^{2-}$ concentration of the absorbing agent slurry.

As described above, dust A removed by the electric precipitator 2 contains ammonium sulfate (($NH_4)_2SO_4$) which is considerably easily dissolved in water. Therefore, if dust A is supplied, the $SO_4^{2-}$ concentration immediately raises so that the state of the absorbing agent slurry is improved to the corrosion preventive region. Moreover, the foregoing operation step causes ammonia ions ($NH_4^+$) in the absorbing agent slurry to increase so that the reactions represented in the above-mentioned formulas (1) to (3) are promoted. As a result, the desulfurizing performance of the gas desulfurization apparatus 4 can be improved.

It is preferable that the quantity of dust A to be supplied is minimized in order to prevent a problem of lowering of the purity of the obtained gypsum. For example, the dust is supplied in proportion to the difference between a reference value near the limit of $SO_4^{2-}$ concentration and the measured value (shortage of $SO_4^{2-}$).

The operation for supplying dust A may be performed by the controller 14 which comprises a microcomputer or the like, to which the sensors 13 and the injection-quantity adjustment means 9 are connected and which automatically controls the valve or the like forming the injection-quantity adjustment means 9 in response to signals from the respective sensors 13. As an alternative to this, the operation may be performed by a manual operation of an operator.

In a second operation step, when the state of the absorbing agent slurry comes close to the corrosion resisting limit of the stainless steel, the flow-rate adjustment valve 11 is operated to increase the quantity of the alkali agent (for example, NaOH) to be supplied into the dust collecting solution in the wet-type dust collector 5 thus raising the $SO_4^{2-}$ concentration in the absorbing agent slurry in order to improve the state of the absorbing agent slurry toward the corrosion preventive side of the corrosion resisting limit of the stainless steel.

It is preferable that the quantity of increase in the alkali agent to be supplied be minimized in order to save the consumption of the alkali agent. For example, the quantity may increase by the degree in proportion to the difference between a reference value near the limit of the concentration of $SO_4^{2-}$ and the measured value (shortage of $SO_4^{2-}$).

It is preferable that the operation of the flow-rate adjustment valve 11 be performed by the controller 14 which comprises a microcomputer or the like, to which the sensors 13 and the flow-rate adjustment valve 11 are connected and which automatically controls the valve 11 in response to signals from each sensors 13. As an alternative to this, the operation may be performed by a manual operation of an operator.

In this case, supply of alkali agent for the purpose of raising the pH is also effective to improve the corrosion resistance.

In a third operation step, when the state of the absorbing agent slurry comes close to the corrosion resisting limit of the stainless steel, the operation of the rotary valve 32a in the limestone silo 32 in the absorbing agent adjustment unit 12 is controlled to increase the quantity of limestone to be supplied to the absorbing agent slurry, thus raising the $Mg^{2+}$ concentration in the absorbing agent slurry in order to raise the $SO_4^{2-}$ concentration in the absorbing agent slurry so that the state of the absorbing agent slurry is improved toward the corrosion preventive side of the corrosion resisting limit of the stainless steel.

Limestone generally contains 5–6% of magnesium carbonate ($MgCO_3$). When $MgCO_3$ has been dissolved in the absorbing agent slurry and thus the $Mg^{2+}$ concentration has raised, the $SO_4^{2-}$ concentration in the absorbing agent slurry raise due to the ion balance. Therefore, by increasing the quantity of limestone to be supplied to the absorbing agent slurry, the state of the absorbing agent slurry can be improved to the corrosion preventive side of the corrosion resisting limit of the stainless steel.

It is preferable that increasing in the quantity of limestone to be supplied be minimized in order to prevent a problem of, for example, lowering of the purity of gypsum because of the increase in the non-reacted calcium carbonate. For example, the quantity may increase by the degree in proportion to the difference between a reference value near the limit of the concentration of $SO_4^{2-}$ and the measured value (shortage of $SO_4^{2-}$).

It is preferable that the operation for increasing the quantity of limestone to be supplied be performed by the controller 14 which comprises a microcomputer or the like, to which the sensors 13 and the absorbing agent adjustment unit 12 are connected and which automatically controls the operation in response to the signal supplied from respective sensor 13. As an alternative to this, the foregoing operation may be performed manually by the operator.

In a fourth operation step, when the state of the absorbing agent slurry comes close to the corrosion resisting limit of the stainless steel, the flow-rate adjustment valve 41 is operated to increase the discharge of the solution which is the component of the absorbing agent slurry so as to lower the $Cl^-$ concentration in the slurry.

The desulfurization apparatus 4 has the structure such that the solution (which is mainly water) which is the component of the absorbing agent slurry is circulating, as shown in FIG. 2. Therefore, $Cl^-$ contained in industrial water to be supplied and arranged to be mixed within the circulating system is accumulated and therefore its concentration is gradually raised because of, for example, evaporation of water if industrial water is left unattended. Therefore, by increasing solution to be discharged from the system, the accumulation of $Cl^-$ can be prevented and thus the concentration of $Cl^-$ can be lowered.

It is preferable that the increasing in the water to be discharged be minimized in order to save supplementary water (industrial water). For example, the quantity may increase by the degree in proportion to the difference between a reference value near the limit of the concentration of $SO_4^{2-}$ and the measured value (shortage of $SO_4^{2-}$).

It is also preferable that the operation for increasing the quantity of water to be discharged be automatically performed by the controller 14 which comprises a microcomputer or the like and to which the sensors 13 and the injection-quantity adjustment means 41 are connected. As an alternative to this, the foregoing operation may be performed manually by the operator.

In a fifth operation step, when the state of the absorbing agent slurry comes close to the corrosion resisting limit of the stainless steel, the charge of the electric precipitator 2 is adjusted to raise the concentration of dust at the outlet port of the electric precipitator 2, thus raising the $SO_4^{2-}$ concentration in the absorbing agent slurry by increasing the quantity of $(NH_4)_2SO_4$ to be introduced into the absorption tower 21 of the exhaust gas desulfurization apparatus 4.

Dust allowed to pass through the electric precipitator 2, as described above, contains ammonium sulfate ($(NH_4)_2SO_4$) which is considerably easily dissolved in water. Therefore, the $SO_4^{2-}$ concentration in the absorbing agent slurry can immediately raise by increasing the quantity of dust allowed to pass through the electric precipitator 2 and introduced into the absorption tower 21, so that the state of the absorbing agent slurry is improved to the corrosion preventive region. Since ammonia ions ($NH_4^+$) increase in the absorbing agent slurry as a result of the foregoing operation, the reactions represented in the foregoing formulas (1) to (3) are promoted so that the desulfurizing performance of the desulfurization apparatus 4 is improved.

It is preferable that degree of raising of the concentration of dust A at the outlet port of the electric precipitator 2 by adjusting the charge of the electric precipitator 2 be minimized to prevent a problem of somewhat lowering of the purity of the obtained gypsum. For example, the quantity may increase by the degree in proportion to the difference between a reference value near the limit of the concentration of $SO_4^{2-}$ and the measured value (shortage of $SO_4^{2-}$).

It is preferable that the operation for adjusting the charge of the electric precipitator 2 be performed by the controller 14 which comprises a microcomputer or the like, to which the sensors 13 and the dry-type electric precipitator 2 are connected and which automatically controls the same in response to a signal from respectively sensor 13. As an alternative to this, the operation may be performed by a manual operation of an operator.

When the fifth operation step is performed, there is a possibility that the quantity of dust allowed to pass through the absorption tower 21 of the gas desulfurization apparatus 4 increases and the amount of discharged dust from the smokestack 7 exceeds the discharge regulation. Since the exhaust gas treatment system shown in FIG. 1 is equipped with the wet-type dust collector 5 in the rear of the exhaust gas desulfurization apparatus 4, dust allowed to pass through the absorption tower 21 is substantially removed by the dust collector 5. Therefore, the amount of dust discharged from the smokestack 7 can reliably be reduced to a level below the discharge regulation. Any one of the first to fifth operation steps may be performed or their combination may be performed simultaneously.

We claim:

1. A corrosion preventive method for preventing corrosion of stainless steel components in an exhaust gas desulfurizing apparatus of an exhaust gas treatment system utilizing a wet-type exhaust gas treatment system via a limestone-gypsum method comprising a dry-type dust collecting apparatus for recovering dust from SOx-containing exhaust gas discharged from a combustion exhaust gas source and an exhaust gas desulfurizing apparatus for bringing the exhaust gas into contact with absorbing solution so as to remove at least sulfur dioxide present in the exhaust gas, and said system being arranged such that $NH_3$ is supplied to a line connecting said combustion exhaust gas source with said dry-type dust collecting apparatus so as to solidify $SO_3$ gas present in the exhaust gas as $(NH_4)_2SO^4$ for removing $(NH_4)_2SO_4$ as a dust, said corrosion preventive method comprising the steps of:

measuring the pH, $Cl^-$ concentration, $SO_4^{2-}$ concentration and temperature of said absorbing solution;

supplying the dust removed by said dry-type dust collecting apparatus into said absorbing solution to raise the concentration of $SO_4^{2-}$ in said absorbing solution when the state of said absorbing solution determined in accordance with the measured values comes close to a corrosion resisting limit of stainless steel so that the state of the absorbing solution is maintained on a corrosion preventive side of the corrosion resisting limit of the stainless steel.

2. A corrosion preventive method for preventing corrosion of stainless steel components in an exhaust gas desulfurizing apparatus of an exhaust gas treatment system comprising an exhaust gas desulfurizing apparatus for bringing SOx-containing exhaust gas from a combustion exhaust gas source into contact with absorbing solution so as to remove at least sulfur dioxide present in the exhaust gas and a wet-type dust collecting apparatus, and said apparatus being arranged such dust collecting solution which has absorbed dust in said wet-type dust collecting apparatus is supplied to an absorbing solution of said exhaust gas desulfurizing apparatus and alkali agent for preventing corrosion is supplied to said dust collecting solution, said corrosion preventive method comprising the steps of:

measuring the pH, $Cl^-$ concentration, $SO_4^{2-}$ concentration and temperature of said absorbing solution; and adjusting the quantity of the alkali agent to be supplied to the dust collecting solution to raise the concentration of $SO_4^{2-}$ in said absorbing solution when the state of said absorbing solution determined in accordance with the measured values comes close to a corrosion resisting limit of stainless steel, so that the state of the absorbing solution is maintained on a corrosion preventive side of the corrosion resisting limit of the stainless steel.

3. An exhaust gas treatment system comprising a combustion exhaust gas source;

an exhaust gas desulfurizing apparatus for removing at least sulfur dioxide present in exhaust gas by bringing the exhaust gas into contact with said absorbing solution;

sensors for measuring the pH, $Cl^-$ concentration, $SO_4^{2-}$ concentration and temperature of said absorbing solution in said exhaust gas desulfurizing apparatus;

a wet-type dust collecting apparatus for removing a dust present in the exhaust gas from said exhaust gas desulfurizing apparatus by bringing the exhaust gas into contact with the dust collecting solution;

a dust collecting solution line for supplying the dust collecting solution which has absorbed said dust in said wet-type dust collecting apparatus to said exhaust gas desulfurizing apparatus;

an alkali agent supply line for supplying alkali agent to said wet-type dust collecting apparatus; and a controller for adjusting the quantity of the alkali agent to be supplied in response to signals from said sensors.

4. A corrosion preventive method for preventing corrosion of stainless steel components in an exhaust gas desulfurizing apparatus of an exhaust gas treatment system comprising the exhaust gas desulfurizing apparatus for bringing exhaust gas from a combustion exhaust gas source into contact with absorbing solution in which limestone containing Mg compounds is suspended so as to remove at least sulfur dioxide present in the exhaust gas, said corrosion preventive method comprising the steps of:

measuring the pH, $Cl^-$ concentration, $SO_4^{2-}$ concentration and the temperature of said absorbing solution; and adjusting the quantity of the limestone supplied to said absorbing solution to raise the concentration of $Mg^{2+}$ in said absorbing solution so as to raise the concentration of $SO_4^{2-}$ in said absorbing solution when the state of said absorbing solution determined in accordance with the measured values comes close to a corrosion resisting limit of stainless steel, so that the state of the absorbing solution is maintained on a corrosion preventive side of the corrosion resisting limit of the stainless steel.

5. An exhaust gas treatment system comprising:

a combustion exhaust gas source;

an exhaust gas desulfurizing apparatus for removing at least sulfur dioxide present in exhaust gas by bringing the exhaust gas into contact with absorbing solution in which limestone containing Mg compounds is suspended;

an absorbing solution adjustment apparatus for adjusting the state of said absorbing solution to be supplied to said exhaust gas desulfurizing apparatus;

sensors for measuring the pH, $Cl^-$ concentration, $SO_4^{2-}$ concentration and temperature of said absorbing solution in said exhaust gas desulfurizing apparatus; and a controller for adjusting the quantity of the limestone supplied in response to signals from said sensors.

6. A corrosion preventive method for preventing corrosion of stainless steel components in an exhaust gas desulfurizing apparatus of an exhaust gas treatment system utilizing a wet-type exhaust treatment system via a limestone-gypsum method comprising a dry-type dust collecting apparatus for recovering dust from exhaust gas discharged from a combustion exhaust gas source and the exhaust gas desulfurizing apparatus for bringing the exhaust gas into contact with absorbing solution to remove at least sulfur dioxide present in the exhaust gas, and said system being arranged such that $NH_3$ is supplied to a line connecting said combustion exhaust gas source with said dry-type dust collecting apparatus so as to solidify $SO_3$ gas present in the exhaust gas as $(NH_4)_2SO_4$ for removing $(NH_4)_2SO_4$ as a dust, said corrosion preventive method comprising the steps of:

measuring the pH, $Cl^-$ concentration, $SO_4^{2-}$ concentration and temperature of said absorbing solution; and adjusting the charge of said wet-type dust collecting apparatus to raise the concentration of dust at an outlet port of said dry-type dust collecting apparatus to increase the quantity of $(NH_4)_2 SO_4$ to be introduced into said exhaust gas desulfurizing apparatus so as to raise the concentration of $SO_4^{2-}$ in said absorbing solution when the state of said absorbing solution determined in accordance with the measured values comes close to a corrosion resisting limit of stainless steel, so that the state of the absorbing solution is maintained on a corrosion preventive side of the corrosion resisting limit of the stainless steel.

* * * * *